US011579930B2

(12) United States Patent
Chaudhary et al.

(10) Patent No.: US 11,579,930 B2
(45) Date of Patent: *Feb. 14, 2023

(54) RESOURCE DETERMINATION BASED ON RESOURCE DEFINITION DATA

(71) Applicant: VMWARE, INC., Palo Alto, CA (US)

(72) Inventors: Vipul Chaudhary, Bangalore (IN);
Sandeep L Hegde, Bangalore (IN);
Shyam Venkatram, Bangalore (IN);
Naren Lal, Bangalore (IN);
Ranganathan Srinivasan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 17/001,711

(22) Filed: Aug. 25, 2020

(65) Prior Publication Data
US 2022/0012096 A1 Jan. 13, 2022

(30) Foreign Application Priority Data
Jul. 11, 2020 (IN) .............................. 202041029560

(51) Int. Cl.
*G06F 3/00* (2006.01)
*G06F 9/50* (2006.01)
*G06F 16/28* (2019.01)
*G06F 9/54* (2006.01)

(52) U.S. Cl.
CPC .............. *G06F 9/5027* (2013.01); *G06F 9/54* (2013.01); *G06F 16/288* (2019.01)

(58) Field of Classification Search
CPC ...................................................... G06F 9/54
USPC ......................................................... 719/328
See application file for complete search history.

(56) References Cited

U.S. PATENT DOCUMENTS

| 9,015,730 B1 * | 4/2015 | Allen ........................ G06F 9/54 719/310 |
| 9,230,022 B1 * | 1/2016 | Banerjee ............... G06F 16/951 |
| 10,917,401 B1 * | 2/2021 | Mantin ............... H04L 63/1425 |

(Continued)

FOREIGN PATENT DOCUMENTS

WO   WO-2018069811 A * 4/2018 ........... G06F 16/242

OTHER PUBLICATIONS

Ian Hopkinson1, A Simple API to the KnowledgeStore. (Year: 2014).*

(Continued)

*Primary Examiner* — Lechi Truong

(57) ABSTRACT

In one example, a computer implemented method may include retrieving resource definition data corresponding to an endpoint. The resource definition data includes resource type information. Further, an API response may be obtained from the endpoint by querying the endpoint using an API call. Furthermore, the API response may be parsed and a resource model corresponding to the resource definition data may be populated using the parsed API response. The resource model may include resource information and associated metric information correspond to a resource type in the resource type information. Further, a resource and/or metric data associated with the resource may be determined using the populated resource model. The resource may be associated with an application being executed in the endpoint.

19 Claims, 6 Drawing Sheets

(56) References Cited

U.S. PATENT DOCUMENTS

| | | | |
|---|---|---|---|
| 2006/0212855 A1* | 9/2006 | Bournas | G06Q 10/00 |
| | | | 717/140 |
| 2020/0252271 A1* | 8/2020 | Elliott, IV | G06F 9/5016 |
| 2020/0364044 A1* | 11/2020 | Bahrami | G06F 8/73 |
| 2021/0349771 A1* | 11/2021 | Horst | G06F 9/44505 |
| 2022/0261299 A1* | 8/2022 | Dhondse | G06N 5/022 |
| 2022/0321602 A1* | 10/2022 | Szigeti | H04L 63/20 |

OTHER PUBLICATIONS

Andrea Arcuri, RESTful API Automated Test Case Generation with EvoMaster. (Year: 2019).*

* cited by examiner

```
# cloud zones resource
- type: CloudZone                                    ~302 baseUrl: /provisioning/mgmt/placement-zones        ~304
    filterUrl: ?expand
    name: 'resourceModel::resName'
    resourceFilteringCriteria: 'documents'
    isResourceDiscovery: false
  resourceModel:                                     ~306
      - keyName: regionId
        filterValue: $.provisioningRegion.regionId
      - keyName: resName
        filterValue: name
      - keyName: resId
        filterValue: documentSelfLink                ~308
        extractionPattern: "[^\/]*$"
      - keyName: computeTags
        filterValue: $.tagsToMatch
      - keyName: capabilityTags
        filterValue: $.tags
      - keyName: endpointId
        filterValue: $.provisioningRegion.endpointLink
        extractionPattern: "[^\/]*$"
  resourceIdentifiers: ['resourceModel::resId']
         attributes:                                 ~310
      - name: regionId
        filterKey: resourceModel::regionId
        isProperty: true
      - name: isDefaultPlacementZone                 ~312
        filterKey: $.customProperties.__isDefaultPlacementZone
        isProperty: true
      - name: principle
        filterKey: documentAuthPrincipalLink
        isProperty: true
        extractionPattern: "[^\/]*$"

-relationshps:                                     ~314
    -relationshipInformation:
      parentResourceKind: Blueprint
      childResourceKind: Deployment
      relationshipField: 'blueprintId'               ~316
    -relationshipInformation:
      parentResourceKind: Project
      childResourceKind: Blueprint
      relationshipField: 'projectId'
```

FIG. 3

RESOURCE DETERMINATION BASED ON RESOURCE DEFINITION DATA

RELATED APPLICATIONS

Benefit is claimed under 35 U.S.C. 119(a)-(d) to Foreign Application Serial No. 202041029560 filed in India entitled "RESOURCE DETERMINATION BASED ON RESOURCE DEFINITION DATA", on Jul. 11, 2020, by VMware, Inc., which is herein incorporated in its entirety by reference for all purposes.

The present application is related in subject matter to U.S. patent application Ser. No. 17/001,742, which is incorporated herein by reference.

TECHNICAL FIELD

The present disclosure relates to computing environments, and more particularly to methods, techniques, and systems for determining resources corresponding to an endpoint based on resource definition data.

BACKGROUND

In application/operating system (OS) monitoring environments, a management node may communicate with multiple endpoints to monitor the endpoints. For example, an endpoint may be a computing environment such as a physical computing environment, a virtual computing environment, or a cloud computing environment. Further, the endpoints may execute different applications via virtual machines (VMs), computing devices, and the like. In such an environment, the management node may communicate with the endpoints to collect performance data/metrics (e.g., application metrics, OS metrics, and the like) from underlying OS and/or services on the endpoints for storage and performance analysis (e.g., to detect and diagnose issues).

BRIEF DESCRIPTION OF THE DRAWINGS

Examples are described in the following detailed description and in reference to the drawings, in which:

FIG. 3 illustrates an example of resource definition data corresponding to the CAS;

Figure 1:
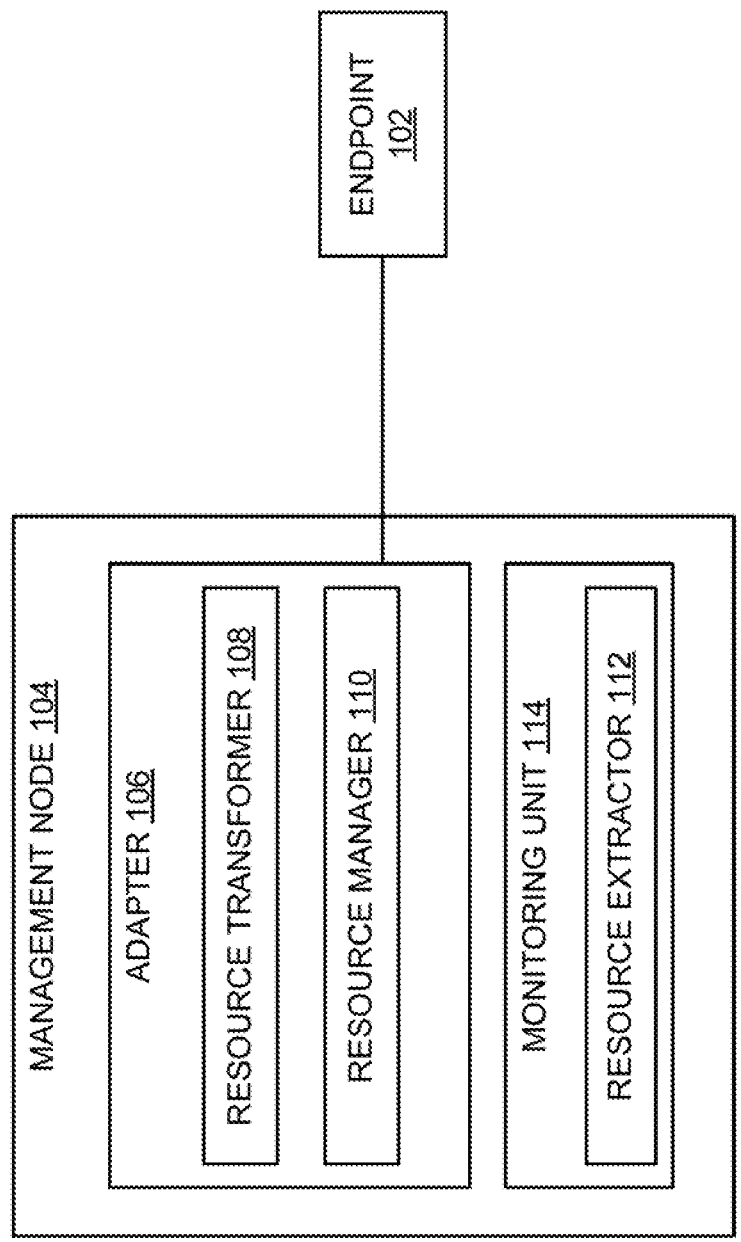
FIG. 1 is a block diagram of an example management node, including a resource extractor to determine resources associated with an endpoint based on resource definition data.

The drawings described herein are for illustration purposes only and are not intended to limit the scope of the present subject matter in any way.

DETAILED DESCRIPTION

Examples described herein may provide an enhanced computer-based and network-based method, technique, and system to determine resources based on resource definition data corresponding to an endpoint. Example endpoint may be a computing environment such as a physical computing environment (e.g. an on-premise enterprise computing environment or a physical data center), a cloud computing environment, and/or a virtual computing environment.

The virtual computing environment may be a pool or collection of cloud infrastructure resources designed for enterprise needs. The infrastructure resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in virtual space being hosted by one or more physical data centers. Example virtual computing environment may execute different types of applications via physical computers, virtual machines, and/or containers.

Further, performance monitoring of such applications has become increasingly important because application monitoring may aid in troubleshooting (e.g., to rectify abnormalities or shortcomings, if any) the applications. Application monitoring may be referred as application performance monitoring (APM) and/or application performance management (APM). Example performance monitoring tool or application or platform (e.g., VMware® vRealize Operations (vROPS), Vmware Wavefront™, and the like) may monitor performance metrics associated with applications running in the endpoints. Thus, the performance monitoring tool may deliver intelligent operations management from applications to underlying infrastructure to provide visibility across physical, virtual, and cloud infrastructures. In some examples, the performance monitoring tool may identify issues in the endpoint using data collected from system resources. Further, the data may be represented in form of objects. These objects (i.e., resources) also help in presenting the actual infrastructure topologies, for instance. Once the resources are created and the topology is drawn, the metrics and properties may be published to these resources. These metrics are used in suggesting corrective actions to fix the issues.

In some examples, the performance monitoring tool may use endpoint application program interface (API) calls for resource discovery and for updating metric/properties on these resources via adapters. An adapter instance may be configured for each endpoint using credentials that are used for communication with the endpoint. However, the adapters may be endpoint specific as the API calls and corresponding API responses differ for each endpoint. Thus, when a new resource needs to be discovered and/or there is a need of new metric for a specific resource, the adapter may require a program/code change.

Examples described herein may provide a management node to determine resources corresponding to an endpoint. Example management node may include an adapter to retrieve resource definition data (e.g., a template) corresponding to an endpoint. The resource definition data includes resource type information. Further, the adapter may obtain an API response from the endpoint by querying the endpoint using an application program interface (API) call. Furthermore, the adapter may parse the API response obtained from the endpoint and populate a resource model corresponding to the resource definition data using the parsed API response. The resource model may include resource information and associated metric information corresponding to a resource type in the resource type information. Furthermore, the adaptor may populate a relationship model corresponding to the resource definition data using the parsed API response. The relationship model may correspond to the resource type.

Further, the management node may include a resource extractor to determine a resource and/or metric data associated with the resource using the populated resource model. In one example, the resource may be associated with an application being executed in the endpoint. Furthermore, the resource extractor may determine a relationship of the resource with another resource using the populated relationship model. Thus, the collected API responses described herein may change through the resource definition data to determine the resources associated with the endpoint and hence eliminate a need for the code change to determine a new resource/metric/relationship, an updated resource/metric/relationship, and/or a modified resource topology associated with the endpoint.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

System Overview and Examples of Operation

FIG. 1 is a block diagram of an example management node 104, including a resource extractor 112 to determine resources associated with an endpoint 102 based on resource definition data. In one example, management node 104 may enable to monitor, troubleshoot, and manage health and capacity of endpoint 102. For example, management node 104 may be a vRealize™ Operations Manager (vROPS), Log Insight™, vRealize Automation®, vRealize Business, and/or Hyperic® that are offered by VMware.

Example endpoint 102 may be one of a physical computing environment, a cloud computing environment, and a virtual computing environment. In one example, endpoint 102 may include a collection of servers and applications that work together at a production phase. Example applications may be accessible to one or more users. For example, endpoint 102 may be VMware® vSphere™, cloud automation services (CAS), a software-defined networking (SDN) network virtualization and security platform (NSX), vSAN, or the like. Further, an application, also referred to as an application program or application software, may be a computer software package that performs a specific function directly for an end user or, in some cases, for another application. Examples of applications may include word processors, database programs, web browsers, development tools, image editors, communication platforms, and the like.

As shown in FIG. 1, management node 104 may include an adapter 106 to communicate with endpoint 102. For example, to manage server instances (e.g., endpoints) in vROPS, an adapter instance may be configured for each server instance. Adapter 106 may need credentials that are used for communication with a target server. The adapter instance that is used to connect to one or more instances of the target server is provided in management node 104, for instance. In one example, adapter 106 may be specific to endpoint 102. For example, a CAS adapter may communicate with the endpoint CAS, an NSX adapter may communicate with the endpoint NSX, a vSphere adapter may communicate with the endpoint vSphere, and the like.

Further, adapter 106 may include a resource transformer 108 to retrieve the resource definition data (e.g., a template) corresponding to endpoint 102. In one example, the resource definition data may include resource type information. In an example, the resource definition data may be included in a computer readable data structure. The computer readable data structure may be formatted in accordance with one or more of JavaScript object notation (JSON), extensible markup language (XML), a binary file, a database file, YAML ain't markup language (YAML), and/or a proprietary encoding scheme. Example resource definition data is described in FIG. 3.

Further, adapter 106 may include a resource manager 110 to obtain a plurality of API responses from endpoint 102 by querying endpoint 102 using an API call. In an example, the resource definition data may include an API call address (e.g., uniform resource locator (URL)) to make the API call to endpoint 102. In another example, the resource definition data may include a reference to an API call address that is located in an external source. The API call address may be associated with the resource of the application being executed in endpoint 102, and may be used to make the API call to endpoint 102. The external source may include a look-up table or external client library. The external client library (also referred as a helper library) may be a set of code that perform specific function that an application needs to do in order to interact with the API. Example of external client library may include flickr-net for .NET, flickgo for Go, flickrj for Java, flickcurl for C, node-flickrapi for Node.js, and the like. In one example, resource manager 110 may generate a thread pool with each thread in the thread pool corresponding to a resource in the resource definition data and execute the thread pool such that each thread is to obtain an API response by querying the endpoint using a respective API call.

Furthermore, resource manager 110 may parse the plurality of API responses obtained from endpoint 102. Further, resource manager 110 may populate a plurality of resource models corresponding to the resource definition data using the parsed plurality of API responses. In one example, each of the resource models may include resource information and associated metric information corresponding to a resource type in the resource type information.

In one example, resource manager 110 may populate a plurality of resource models by:
  populating the resource information of the plurality of resource models in the resource definition data with the parsed plurality of API responses, and
  applying transformation rules defined in the resource definition data to the parsed plurality of API responses and/or the populated resource information to populate the metric information of the plurality of resource models.

Further, resource manager 110 may populate a relationship model in the resource definition data using the parsed API responses. In one example, relationship model may correspond to the resource type. Example relationship model is described in FIG. 3.

Furthermore, management node 104 may include a monitoring unit 114 having a resource extractor 112 to determine a plurality of resources and/or metric data associated with the plurality of resources using the populated plurality of resource models. In one example, the resources may be associated with one or more applications being executed in endpoint 102. Further, resource extractor 112 may determine a relationship between the plurality of resources using the populated relationship model.

In one example, resource extractor 112 may present the plurality of resources and/or the metric data associated with the plurality of resources on a graphical user interface (e.g., a display). In another example, resource extractor 112 may generate a resource topology corresponding to the endpoint using the determined relationship between the plurality of resources. Example resource topology may depict relationships between the plurality of resources. Further, resource extractor 112 may present the generated resource topology on the graphical user interface.

In some examples, the functionalities described herein, in relation to instructions to implement functions of resource transformer 108, resource manager 110, resource extractor 112, monitoring unit 114, and any additional instructions described herein in relation to the storage medium, may be implemented as engines or modules includes any combination of hardware and programming to implement the functionalities of the modules or engines described herein. The functions of resource transformer 108, resource manager 110, resource extractor 112, and monitoring unit 114 may also be implemented by a respective processor. In examples described herein, the processor may include, for example, one processor or multiple processors included in a single device or distributed across multiple devices. In some examples, management node 104 including adapter 106 can be a part of management software (e.g., vROPS and/or Wavefront that are offered by VMware®).

Figure 2:
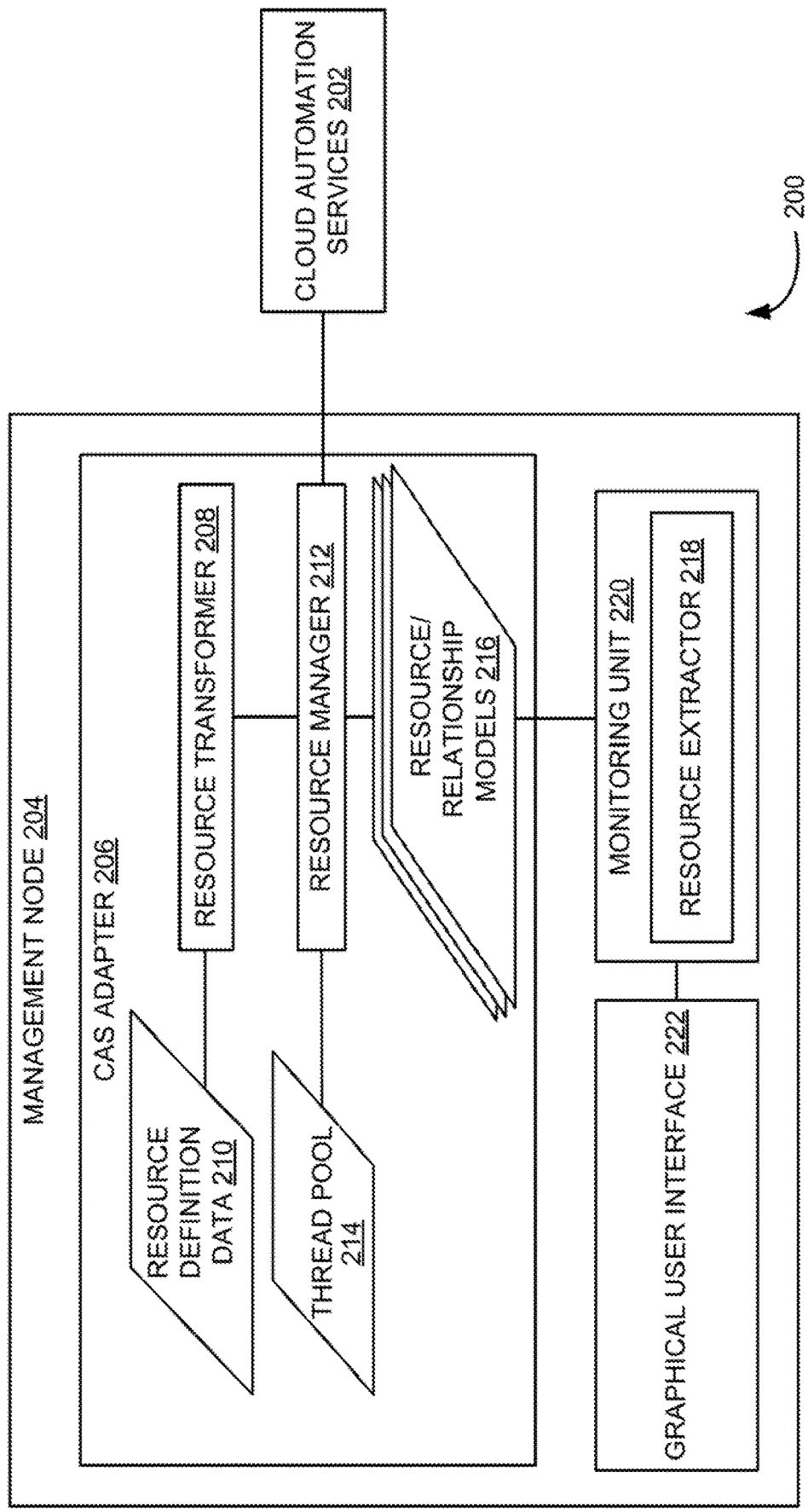
FIG. 2 is a block diagram of an example computing environment, including a management node to determine resources associated with an endpoint "cloud automation services (CAS)" based on resource definition data.

FIG. 2 is a block diagram of an example computing environment 200, including a management node 204 to determine resources associated with an endpoint (e.g., CAS 202) based on resource definition data 210. For example, management node 204 may be a vRealize™ Operations Manager (vROPS), Log Insight™, vRealize Automation®, vRealize Business, and/or Hyperic® that are offered by VMware. Management node 204 may provide operations management across physical, virtual, and cloud environments. In one example, management node 204 may monitor CAS 202 to present issues in CAS 202 and steer an administrator in a right direction for troubleshooting. For example, using management node 204, different resource types associated with CAS 202 such as "cloud accounts", "cloud zones", "projects", "blueprints", "deployment", and "virtual machines" may be monitored.

As shown in FIG. 2, management node 204 may include a CAS adapter 206 to communicate with CAS 202. Further, CAS adapter 206 may include a resource transformer 208 to retrieve resource definition data 210 corresponding to CAS 202. In one example, resource definition data 210 may include information about API calls, resource type, metric/properties data collection, and the like corresponding to CAS 202. Further, resource transformer 208 may read resource definition data 210 and generate transformation rules or definitions in resource definition data 210. Furthermore, resource transformer 208 may validate the transformation definitions in resource definition data 210 against a predefined transformation schema. Example predefined transformation schema may be an XML Schema.

Further, CAS adapter 206 may include a resource manager 212 to generate a thread pool 214 with each thread in thread pool 214 corresponding to a resource type in resource definition data 210. For example, resource manager 212 may generate thread pool 214 and assign the resource creation to each thread in thread pool 214 upon iterating over resource definition data 210. In this example, each thread in thread pool 214 is assigned to a resource type in resource definition data 210. Furthermore, resource manager 212 may execute thread pool 214 such that each thread is to obtain an API response by querying CAS 202 using a respective API call. In one example, each thread in thread pool 214 may communicate to resource manager 212 in order to make the API call.

Further, resource manager 212 may parse API responses obtained from CAS 202. Furthermore, resource manager 212 may populate resource models 216 corresponding to resource definition data 210 using the parsed API responses. In one example, resource models 216 may include resource information and associated metric information. Further, resource models 216 and associated metric information may correspond to one or more resource types in the resource type information. Further, resource manager 212 may populate a relationship model corresponding to resource definition data 210 using the parsed API response. In one example, the relationship model may correspond to the resource type. Thus, resource manager 212 may make the API call to endpoint CAS 202, read the API response, populate resource/relationship models 216 and then store populated resource/relationship models 216 in memory (e.g., adapter cache), which may be used for determining resources, metric data associated with the resources, and a relationship between the resources.

Furthermore, CAS adapter 206 may include a monitoring unit 220 having resource extractor 218 to determine resources and/or metric data associated with the resources using the populated resource models 216. In one example, a resource may be associated with an application being executed in CAS 202.

Further, resource extractor 218 may generate a resource topology corresponding to CAS 202 using the determined relationship between the resources. Further, resource extractor 218 may present the resources, the metric data associated with the resources, and/or the resource topology on a graphical user interface 222.

FIG. 3 depicts an example of resource definition data 300 corresponding to the CAS (e.g., as shown in FIG. 2). In one example, resource definition data 300 may be included in a computer readable data structure. The computer readable data structure may be formatted in accordance with one or more of JSON, XML, a binary file, a database file, YAML, and/or a proprietary encoding scheme. Example of resource definition data 300 shown in FIG. 3 is a YAML file corresponding to an endpoint CAS.

In one example, resource definition data 300 may include resource type information, which may disclose a type of resource which has to be discovered. For example, resource definition data 300 may be a template to determine resources corresponding to different resource types associated with the CAS such as "cloud accounts", "cloud zones", "projects", "blueprints", "deployment", and "virtual machines". In example resource definition data 300 of FIG. 3, a template for resource type "cloud zone" (e.g., 302) is depicted. In other examples, resource definition data 300 can include a single template for multiple resource types.

Further, resource definition data 300 may include an API call address (e.g., uniform resource locator (URL) (e.g., 304)). In another example, resource definition data 300 may include a reference to the API call address that is located in an external source. The API call address may be used to make the API call to the endpoint For example, the URL 304 may be associated with a resource (e.g., associated with an application being executed in the CAS) corresponding to resource type "cloud zone" 302. In one example, a CAS adapter (e.g., CAS adapter 206 of FIG. 2) in a management node may use URL 304 to make a query to the endpoint "CAS" to discover resources corresponding to the resource type "cloud zone" 302. Further, example API response received corresponding to the query may be converted in a form of resource model (e.g., 306) as defined in resource definition data 300. In one example, the API response may be in a JavaScript object notation (JSON) format, an XML format, or the like.

In one example, resource model 306 may include resource information 308. For example, resource information 308 may be included through fields such as "resName", "resId", "endpointId", and the like along with corresponding filter values. Example filter value may assist the CAS adapter to parse through the API response and retrieve the resource information. In one example, upon receiving the API response, resource model 306 may be populated. For example, the CAS adapter may utilize the JSONPath to retrieve the resource information for populating resource model 306.

Further, resource model 306 may include attributes field (e.g., 310). Attributes field 310 may include information about properties and metrics (e.g., 312). In one example, the metrics can be populated from resource information 308. In another example, the metrics can be fetched directly from the API response. Thus, only the required information may be stored in java runtime memory. Further, when the attribute needs to be added as property, the "isProperty flag" may be set as "true" else the attribute will be added as a metric.

Furthermore, resource definition data 300 may include a relationship model 314. In one example, relationship model 314 may include fields (e.g., 316) such as "parent Resource Kind", "child Resource Kind", "relationship Field", and the like to determine a relationship of the resource with another resource. For example, a relationship between resources "blueprint" and "deployment" may be determined based on relationship field "blue print Id" (e.g., as shown in fields 316), which may be a common field in both the resources' API responses.

Thus, example resource definition data 300 may include resource kind information 302, API call address 304, metric/properties data collection information 310, and relationship determination information 314. For each resource kind specified in resource definition data 300, there may be corresponding resource model 306 and relationship model 314 populated which can be used for determining resources and forming relationship between the resources. With resource definition data 300, at runtime, the collection information may change through resource definition data 300 and hence no need to change the code when there is a need of changing resource discovery, the resource topology (e.g., relationship) or there is a need of adding/updating a metric/property.

Example Processes

Figure 4:
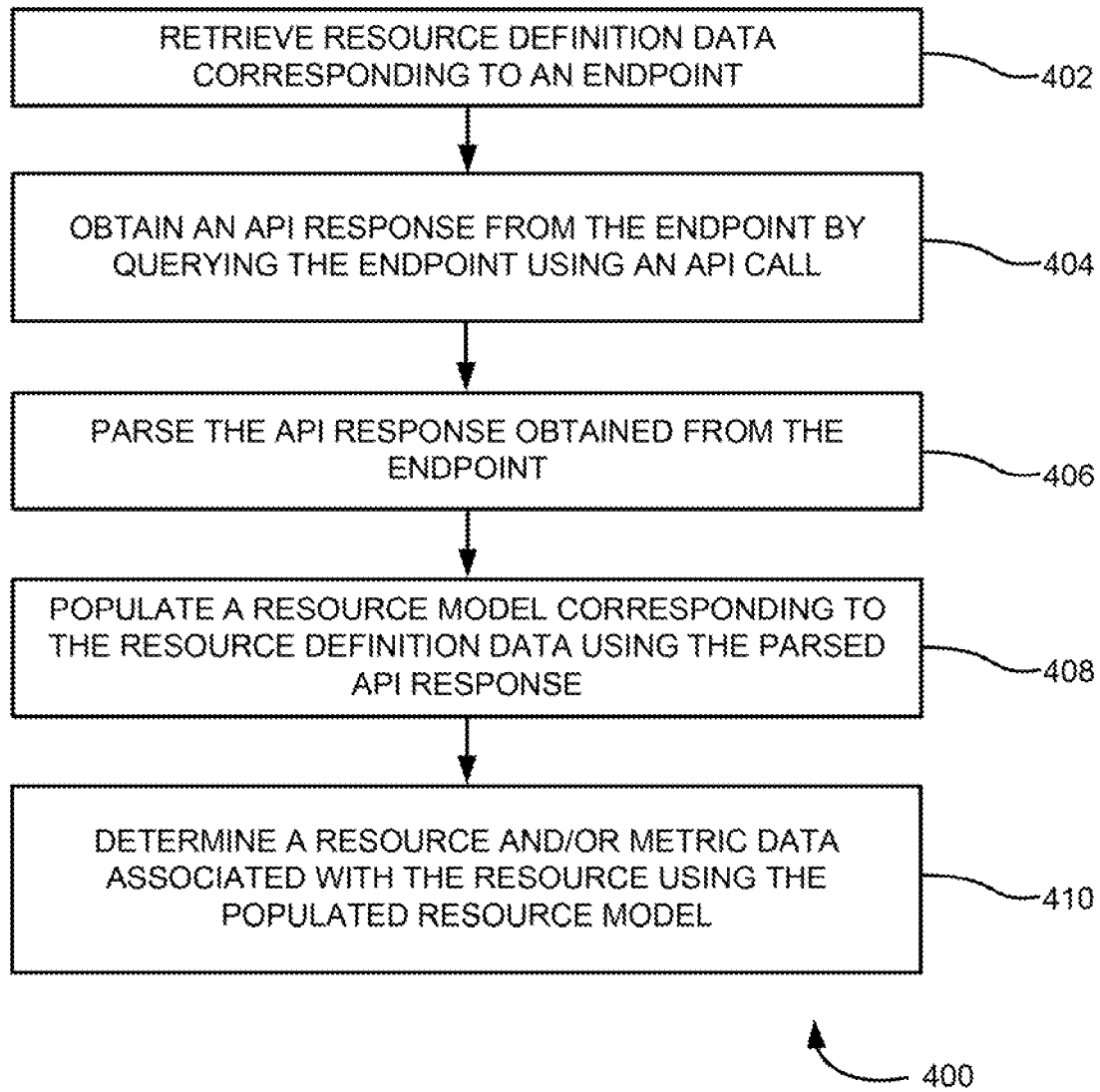
FIG. 4 is a flow diagram illustrating an example method to determine a resource based on resource definition data corresponding to an endpoint.

FIG. 4 is a flow diagram illustrating an example method 400 to determine a resource based on resource definition data corresponding to an endpoint. At 402, the resource definition data corresponding to an endpoint may be retrieved. In one example, the resource definition data may include resource type information. Example resource definition data may be included in a computer readable data structure. The computer readable data structure may be formatted in accordance with one or more of JavaScript object notation (JSON), extensible markup language (XML), a binary file, a database file, YAML ain't markup language (YAML), and/or a proprietary encoding scheme.

Example endpoint may include a collection of servers and applications that work together at a production phase. Further, the applications being accessible to one or more users.

At 404, an API response may be obtained from the endpoint by querying the endpoint using an application program interface (API) call. In one example, the resource definition data may include an API call address (e.g., uniform resource locator (URL)) to make the API call to the endpoint. In another example, the resource definition data may include a reference to the API call address that is located in an external source. The API call address may be used to make the API call to the endpoint. Further, obtaining the API response may include validating transformation definitions in the resource definition data against a predefined transformation schema, generating a thread corresponding to the resource type, and executing the thread. The thread may be executed to query the endpoint by making the API call and obtain the API response in response to the query.

At 406, the API response obtained from the endpoint may be parsed. At 408, a resource model corresponding to the resource definition data may be populated using the parsed API response. In one example, the resource model may include resource information and associated metric information corresponding to a resource type in the resource type information. In one example, the resource information of the resource model in the resource definition data may be populated with the parsed API response. Further, transformation rules defined in the resource definition data may be applied to the parsed API response and/or the populated resource information to populate the metric information of the resource model. Further, populating the resource model and the associated metric information may include validating values in the parsed API response and populating the resource model and the associated metric information in the resource definition data using the parsed API response upon a successful validation.

At 410, a resource and/or metric data associated with the resource may be determined using the populated resource model. In one example, the resource may be associated with an application being executed in the endpoint.

In one example, method 400 may further include presenting the determined resource and/or the metric data associated with the resource on a graphical user interface. In another example, method 400 may further include populating a relationship model in the resource definition data using the parsed API response. Example relationship model corresponds to the resource type. Further, a relationship of the resource with another resource may be determined using the populated relationship model and the relationship may be presented on the graphical user interface.

Figure 5:
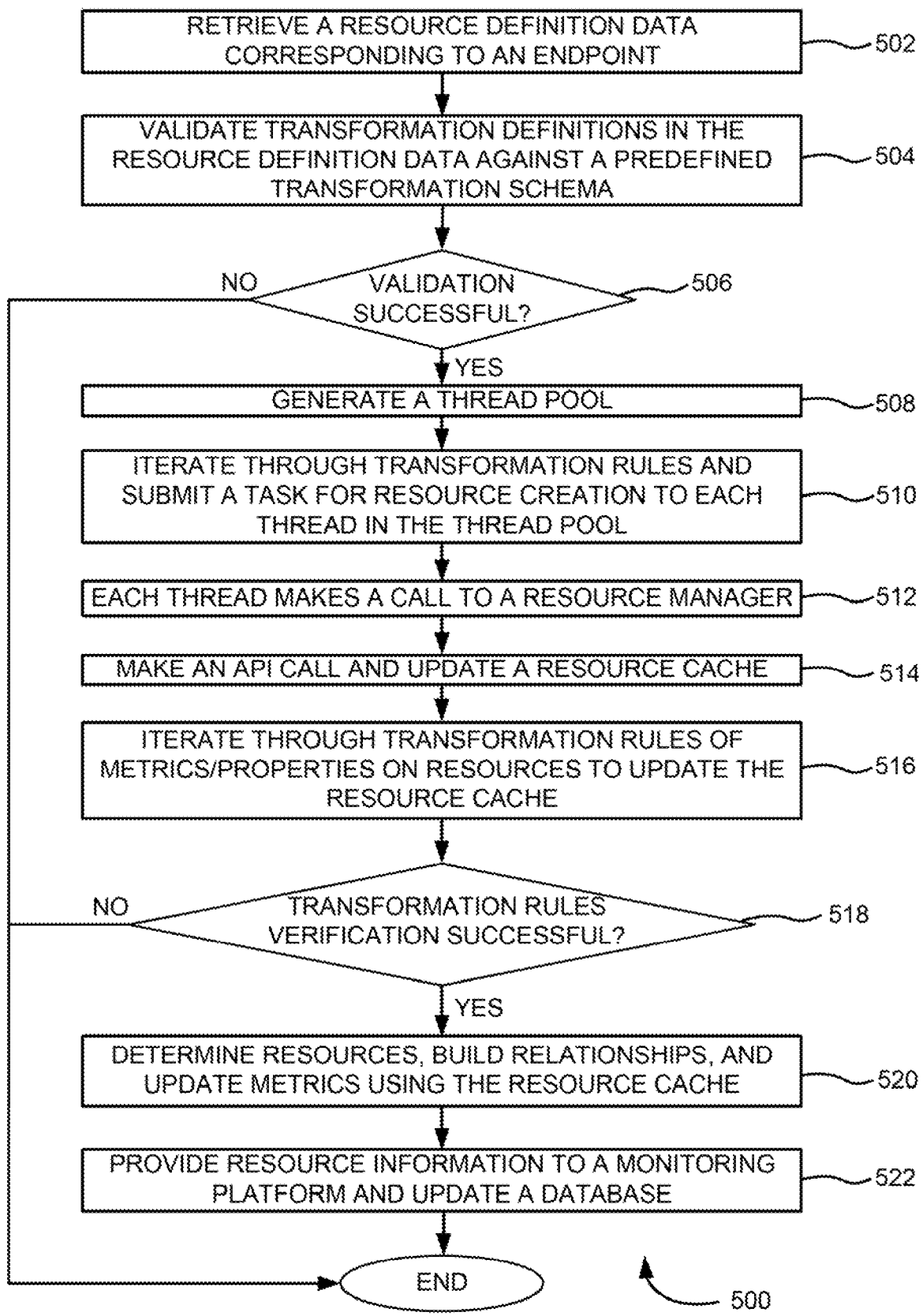
FIG. 5 is a flow diagram illustrating another example method to determine resources based on resource definition data corresponding to an endpoint.

FIG. 5 is a flow diagram illustrating another example method 500 to determine resources based on resource definition data corresponding to an endpoint. At 502, the resource definition data corresponding to the endpoint may be retrieved. In one example, the resource definition data may include API call address, resource type information, metric/properties data collection information, and resource relationship information. At 504, transformation definitions in the resource definition data may be validated against a predefined transformation schema. In one example, the resource kind information and the metric/properties data collection information may have to match with the transformation schema (e.g., describe.xml file), so a monitoring platform (e.g., vROPS) can understand a resource schema and update the resource kinds upon an adapter installation.

At 506, a check may be made to determine whether the validation is successful. When the validation is unsuccessful, method 500 may be terminated. At 508, when the validation is successful, a thread pool may be generated. At 510, a task for resource creation may be submitted to each thread in the thread pool by iterating through transformation rules in the resource definition data. At 512, each thread in the thread pool may make a call to a resource manager of the monitoring platform. At 514, an API call may be made by the resource manager to the endpoint and accordingly a resource cache may be updated (i.e., a resource model may be populated) with an API response corresponding to the API call.

At 516, the resource manager iterates through the transformation rules of metrics/properties on resources to populate the metric/properties information in the resource cache. At 518, a check may be made to determine the transformation rules verification is successful. When the verification is unsuccessful, method 500 may be terminated. At 520, when the verification is successful, resources may be determined, relationships between the resources may be built, and metrics may be updated with corresponding resources using the resource cache. In some examples, a relationship model in the resource definition data may be populated using the parsed API response. Further, the relationship between the resources may be determined using the populated relationship model. At 522, resource information (e.g., determined resources, relationships between the resources, and the metrics) may be stored and provided to the monitoring platform for further analysis. Thus, with the examples described herein, resource data collection knowledge can be configured declaratively. Further, since the resource definition data is used to determine the resources, a process of resource data collection can be centralized and efficient.

It should be understood that the processes depicted in FIGS. 4 and 5 represent generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

Figure 6:
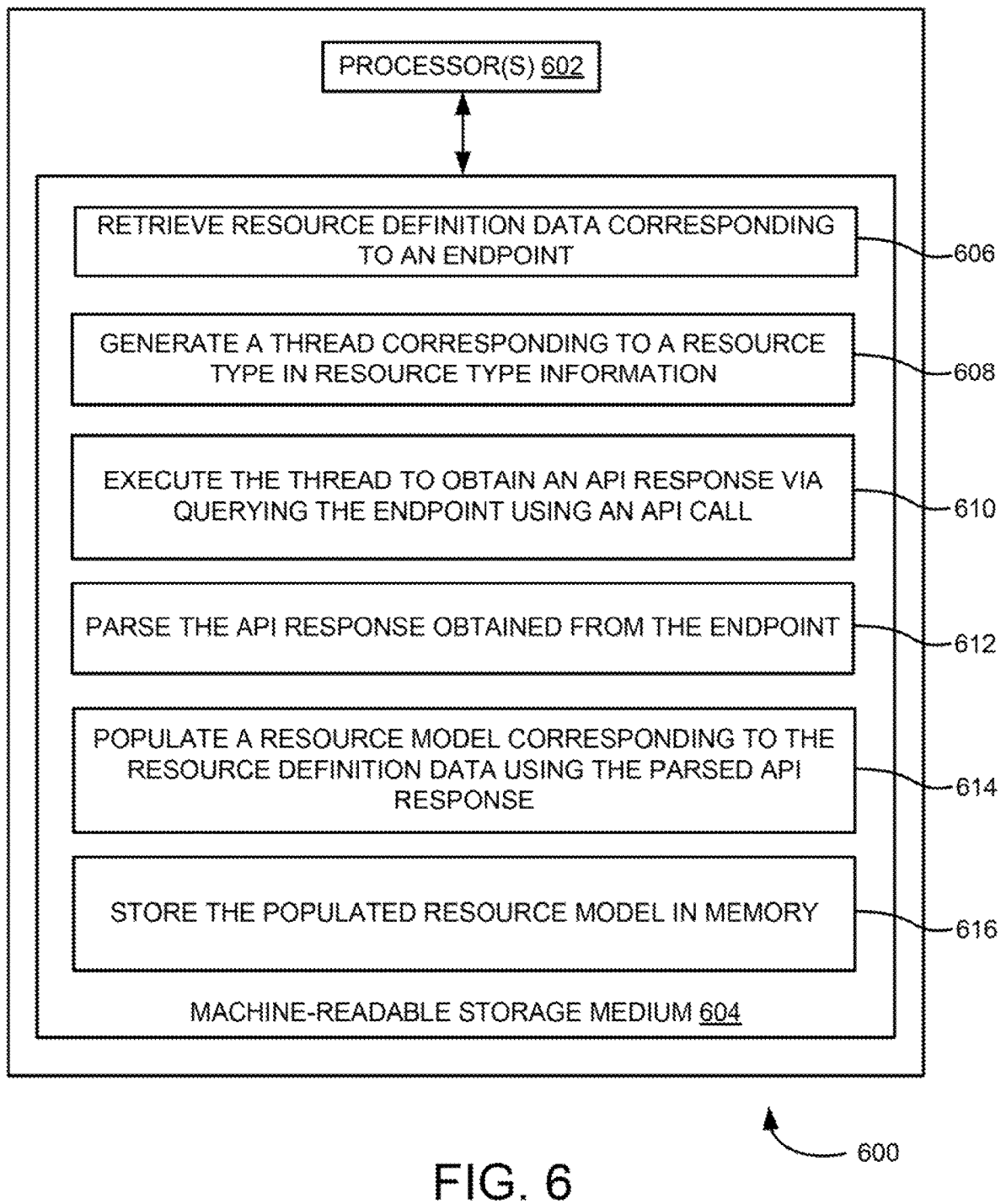
FIG. 6 is a block diagram of an example computing device including a non-transitory computer-readable storage medium storing instructions to determine resources based on resource definition data corresponding to an endpoint.

FIG. 6 is a block diagram of an example computing device 600 (e.g., management node 104 as shown in FIG. 1) including a non-transitory computer-readable storage medium 604 storing instructions to determine resources based on resource definition data corresponding to an endpoint. Computing device 600 may include a processor 602 and machine-readable storage medium 604 communicatively coupled through a system bus. Processor 602 may be any type of central processing unit (CPU), microprocessor, or processing logic that interprets and executes machine-readable instructions stored in machine-readable storage medium 604. Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to computing system 600.

Machine-readable storage medium 604 may store instructions 606-616. In an example, instructions 606-616 may be executed by processor 602 to determine resources based on the resource definition data corresponding to the endpoint. Instructions 606 may be executed by processor 602 to retrieve the resource definition data corresponding to the endpoint from an adapter of computing device 600. In one example, the adapter is to enable communication with the endpoint. The resource definition data may include resource type information. Example resource definition data may be included in a computer readable data structure. The computer readable data structure may be formatted in accordance with one or more of JavaScript object notation (JSON), extensible markup language (XML), a binary file, a database file, YAML ain't markup language (YAML), and/or a proprietary encoding scheme.

Instructions 608 may be executed by processor 602 to generate a thread corresponding to a resource type in the resource type information. Instructions 610 may be executed by processor 602 to execute the thread to obtain an API response by querying the endpoint using an API call. In one example, the resource definition data may include an API call address (e.g., uniform resource locator (URL)) to make the API call to the endpoint. In another example, the resource definition data may include a reference to an API call address that is located in an external source. The API call address may be used to make the API call to the endpoint. Instructions 612 may be executed by processor 602 to parse the API response obtained from the endpoint.

Instructions 614 may be executed by processor 602 to populate a resource model corresponding to the resource definition data using the parsed API response. Example resource model may include resource information and associated metric information corresponding to the resource type in the resource type information. In one example, instructions to populate the resource model corresponding to the resource definition data may include instructions to convert the parsed API response in a form of the resource model in the resource definition data.

Further, instructions 616 may be executed by processor 602 to store the populated resource model in memory of the computing device. Furthermore, machine-readable storage medium 604 may store instructions that, when executed by processor 602, cause processor 602 to determine a resource and/or metric data using the populated resource model in the memory. In one example, the resource may be associated with an application being executed in the endpoint.

Examples described in FIGS. 1-6 can be implemented in monitoring platform products such as vRealize Operations, Wavefront, and the like that are offered by VMware.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A computer implemented method comprising:
communicating with an endpoint by the adapter which comprises a resource transformer for retrieving resource definition data corresponding to an endpoint, wherein the resource definition data comprises resource type information, wherein the resource definition data is a template to determine at least one resource corresponding to at least one resource type;
obtaining a plurality of application program interface (API) responses from the endpoint by querying the endpoint using API call;
parsing the API response obtained from the endpoint;
populating a resource model corresponding to the resource definition data using the parsed API response, wherein the resource model comprises resource information and associated metric information corresponding to a resource type in the resource type information; and
determining a resource and/or metric data associated with the resource using the populated resource model, wherein the resource is associated with an application being executed in the endpoint;
presenting the determined resource and/or the metric data associated with the resource on a graphical user interface.

2. The computer implemented method of claim 1, further comprising: populating a relationship model corresponding to the resource definition data using the parsed API response, wherein the relationship model corresponds to the resource type; determining a relationship of the resource with another resource using the populated relationship model; and presenting the relationship on a graphical user interface.

3. The computer implemented method of claim 1, wherein obtaining the API response comprises: generating a thread corresponding to the resource type; and executing the thread to: query the endpoint by making the API call; and obtain the API response in response to the query.

4. The computer implemented method of claim 3, further comprising: validating transformation definitions in the resource definition data against a predefined transformation schema prior to generating the thread.

5. The computer implemented method of claim 1, wherein populating the resource model corresponding to the resource definition data comprises: populating the resource information of the resource model in the resource definition data with the parsed API response; and applying transformation rules defined in the resource definition data to the parsed API response and/or the populated resource information to populate the metric information of the resource model.

6. The computer implemented method of claim 5, further comprising: validating values in the parsed API response; and populating the resource model in the resource definition data using the parsed API response upon a successful validation.

7. The computer implemented method of claim 1, wherein the resource definition data is included in a computer readable data structure, and wherein the computer readable data structure is formatted in accordance with one or more of JavaScript object notation (JSON), extensible markup language (XML), a binary file, a database file, YAML ain't markup language (YAML), and/or a proprietary encoding scheme.

8. The computer implemented method of claim 1, wherein the resource definition data comprises an API call address to make the API call to the endpoint.

9. The computer implemented method of claim 1, wherein the resource definition data comprises a reference to an API call address that is located in an external source, wherein the API call address is used to make the API call to the endpoint.

10. The computer implemented method of claim 1, wherein the endpoint comprises a collection of servers and applications that work together at a production phase, the applications being accessible to one or more users.

11. A management node comprising:
a processor; and
memory coupled to the processor, wherein the memory comprises:
an adapter to communicate with an endpoint, the adapter comprising:
a resource transformer to:
retrieve resource definition data corresponding to the endpoint, wherein the resource definition data comprises resource type information, wherein the resource definition data is a template to determine at least one resource corresponding to at least one resource type; and a resource manager to:
obtain a plurality of application program interface (API) responses from the endpoint by querying the endpoint using an API call; parse the API responses obtained from the endpoint; and populate a plurality of resource models corresponding to the resource definition data using the parsed API responses, wherein each of the resource models comprises resource information and associated metric information that correspond to a resource type in the resource type information; and
a resource extractor to:

determine a plurality of resources and/or metric data associated with the resources using the populated resource models;

wherein the resource extractor is to: present the plurality of resources and/or the metric data associated with the plurality of resources on a graphical user interface, wherein the resources are associated with one or more applications being executed in the endpoint.

12. The management node of claim 11, wherein the resource extractor is to: populate a relationship model corresponding to the resource definition data using the parsed API responses, wherein the relationship model corresponds to the resource type; determine a relationship between the plurality of resources using the populated relationship model; generate a resource topology corresponding to the endpoint using the determined relationship between the plurality of resources; and present the generated resource topology on a graphical user interface.

13. The management node of claim 11, wherein the resource manager is to: generate a thread pool with each thread in the thread pool corresponding to a resource type in the resource definition data; and execute the thread pool such that each thread is to obtain a corresponding API response by querying the endpoint by making the API call.

14. The management node of claim 11, wherein the resource manager is to: populate the resource information of the plurality of resource models in the resource definition data with the parsed plurality of API responses; and apply transformation rules defined in the resource definition data to the parsed plurality of API responses and/or the plurality of populated resource information to populate the metric information.

15. The management node of claim 11, wherein the endpoint comprises one of a physical computing environment, a cloud computing environment, and a virtual computing environment.

16. A non-transitory machine-readable storage medium encoded with instructions that, when executed by a computing device, cause the computing device to:

communicating with an endpoint by the adapter which comprises a resource transformer to retrieve resource definition data corresponding to an endpoint from an adapter of the computing device, wherein the adapter is to enable communication with the endpoint, wherein the resource definition data comprises resource type information, and wherein the resource definition data is a template to determine at least one resource corresponding to at least one resource type;

generate a thread corresponding to a resource type in the resource type information;

execute the thread to obtain a plurality of application program interface (API) responses by querying the endpoint using an API call;

parse the API response obtained from the endpoint;

populate a resource model corresponding to the resource definition data using the parsed API response, wherein the resource model comprises resource information and associated metric information corresponding to the resource type; and store the populated resource model in a memory;

wherein the resource extractor is to: present the plurality of resources and/or the metric data associated with the plurality of resources on a graphical user interface, wherein the resources are associated with one or more applications being executed in the endpoint.

17. The non-transitory machine-readable storage medium of claim 16, wherein instructions to populate the resource model comprise instructions to: convert the parsed API response in a form of the resource model defined in the resource definition data.

18. The non-transitory machine-readable storage medium of claim 16, wherein the resource definition data comprises an API call address to make the API call to the endpoint.

19. The non-transitory machine-readable storage medium of claim 16, wherein the resource definition data comprises a reference to an API call address that is located in an external source, wherein the API call address is used to make the API call to the endpoint.

* * * * *